United States Patent
Prather et al.

(12)

(10) Patent No.: US 6,271,755 B1
(45) Date of Patent: Aug. 7, 2001

(54) SHOPPING CART WITH IMPROVED THEFT DISABLING DEVICE

(76) Inventors: James G. Prather, 18392 Vista del Lago, Yorba Linda, CA (US) 92886; Miguel Orozco, 11335 Lemming St., Lakewood, CA (US) 90715; Patrick Maandag, 3677 Briarvale St., Corona, CA (US) 91719; Harold Duffy, P.O. Box 374, Inyokern, CA (US) 93527

( * ) Notice: Subject to any disclaimer, the term of this patent is extended or adjusted under 35 U.S.C. 154(b) by 0 days.

(21) Appl. No.: 09/517,880

(22) Filed: Mar. 2, 2000

Related U.S. Application Data

(63) Continuation-in-part of application No. 09/083,476, filed on May 22, 1998, now Pat. No. 6,054,923.
(60) Provisional application No. 60/154,705, filed on Sep. 18, 1999, and provisional application No. 60/153,483, filed on Sep. 11, 1999.

(51) Int. Cl.[7] .................................................. G08B 13/14
(52) U.S. Cl. ........................ 340/568.5; 188/1.12; 188/19; 280/33.994
(58) Field of Search ................................. 340/568.5, 539, 340/571; 188/1.12, 111, 19; 280/33.994, 33.993, 33.992

(56) References Cited

U.S. PATENT DOCUMENTS

| | | | |
|---|---|---|---|
| 4,242,668 | * | 12/1980 | Herzog .................................. 340/539 |
| 4,577,880 | * | 3/1986 | Bianco ............................. 280/33.994 |
| 4,580,800 | * | 4/1986 | Upton et al. ..................... 280/33.994 |

* cited by examiner

*Primary Examiner*—Nina Tong
(74) *Attorney, Agent, or Firm*—Terrell P. Lewis

(57) ABSTRACT

An anti-theft system for a shopping cart comprises a collapsible front suspension mounted between the front side members of a base frame of the shopping cart, the front suspension including a support, a first set of casters mounted to the support, retractable pin means carried by the support and engagable with the side members of the base frame for maintaining the front suspension in an operative mode in which the first set of casters engage a supporting surface, a sensor for detecting a first external signal, apparatus functionally coupled to the sensor for transmitting an activation signal to the retractable pin means to cause retraction of the pin means and render the front suspension inoperative, and a second set of casters fixed to the base frame for preventing the cart from moving in a linear direction, when the front suspension is rendered inoperative.

24 Claims, 5 Drawing Sheets

SHOPPING CART WITH IMPROVED THEFT DISABLING DEVICE

This application is a continuation-in-part of application Ser. No. 09/083,476, filed on May 22, 1998, now U.S. Pat. No. 6,054,923, and claims priority from, and also incorporates by reference, the entire disclosures of, Provisional Patent Application Ser. No. 60/154,705 filed Sep. 18, 1999, and entitled CAPTIVE WHEEL TUBES (FOR FRONT WHEELS) AND ROTATING REAR CASTER WITH FORWARD FACING STOP DOG, and Provisional Patent Application Ser. No. 60/153,483 filed Sep. 11, 1999, and entitled FIXED DIRECTIONAL CASTERS.

BACKGROUND OF THE INVENTION

1. Field of the Invention

This invention relates to theft-thwarting devices to help prevent the loss of shopping carts from shopping stores. The invention disables operation of the front wheels of the cart as well as the rear wheels, and keeps the cart from being pushed out of the parking lot once the front wheels of the cart are disabled.

2. Description of Related Art

Millions of dollars are lost each year by grocery stores and shopping marts as a result of shopping cart theft. The expenses associated with shopping cart theft include cart replacement (with typical costs ranging from $55 to $85 per cart) and costs for retrieval of carts taken off the premises.

In applicants' co-pending application, a shopping cart having novel anti-theft features was disclosed and claimed. In particular, the invention in that application addressed the problem of improper removal of shopping carts from the store's premises, and proposed as a solution a disabling apparatus comprising a combination of structural features borne by the basket supporting frame of the cart to render the cart's wheels inoperative upon actuation of the disabling apparatus. The object of the invention was to make it extremely difficult for a person having the intent to remove the cart from the store's premises by rolling it away.

The present invention is drawn to improvements over the previously presented subject matter, and incorporates additional shopping cart theft thwarting features. One major objective of the present invention is to defeat shopping cart theft attempts where the wheels of the shopping cart have been disabled but the thief still tries to remove the cart from the premises by tipping the cart so that the disabled wheels are removed from contact with the ground. In this way, the thief can then wheel the cart away on two wheels.

In response to the obvious need for a theft proof cart, several types of anti-theft devices for shopping carts have previously been developed. For example, U.S. Pat. No. 3,717,225 to Rashbaum (1973) discloses a piston rod and wheel lock device. This device includes a frame mounted actuator that locks one of the wheels of the cart. It does not eliminate the potential for the use of one bank of cart wheels rotating by lifting the disabled wheel from the contact with the ground. U.S. Pat. No. 5,315,290 to Moreno (1994) discloses an electronic wheel lock device. This device also fails to eliminate the possibility of leaning the cart to the side of the still active wheels. U.S. Pat. No. 4,2422,668 to Herzog (1980) discloses a collapsible sub frame causing the wheels to swing out of operative position. This device immobilizes the front wheels of the cart, but does not eliminate the possibility the cart can be leaned back, and rolled away using the rear wheels of the cart. U.S. Pat. No. 5,357,182 to Wolfe et al. (1994) discloses a braked wheel device. This device also fails to eliminate the possibility of leaning the cart to the side of the still active wheels once the cart has left the boundary of the parking lot. U.S. Pat. No. 4,524,985 to Drake (1985) discloses an arrest device for a wheeled cart, which relies on a hooking device in the parking lot, but does not appear to eliminate the possibility that the cart could be leaned to one side to avoid the hooking device. Similarly, U.S. Pat. No. 5,576,691 to Coaklet et al. (1996) discloses another form of a wheel locking device that also fails to prevent the removal of the cart by a user who can simply tip the cart onto its back wheels and roll the cart away. U.S. Pat. No. 4,577.880 to Bianco (1986) discloses still another form of a wheel locking device that fails to eliminate the removal of the cart by simply tipping the cart on to the back wheels and rolling the cart away. U.S. Pat. No. 4,772,880 to Goldstein (1988) discloses another form of the wheel locking device, disabling only one of the front wheels. U.S. Pat. No. 5,194,844 to Zelda (1993) discloses a proximity wheel locking mechanism. This device also fails to eliminate the removal of the cart by simply tipping the cart on to the back wheels and rolling the cart away. U.S. Pat. No. 4,591,175 to Upton (1986) discloses a magnetic wheel locking mechanism. This device also fails to eliminate the removal of the cart by simply tipping the cart on to the back wheels and rolling the cart away.

Many of the devices disclosed by these patents demonstrate that disabling only one wheel of a shopping cart is insufficient to completely immobilize the cart, for even if one wheel is disabled, the person removing the cart can continue to push the cart with sufficient force to override the traction of the locked wheel. Moreover, a shopping cart of the Herzog design, in which the two wheels of the front wheel assembly were disabled by allowing the sub frame of the cart to collapse around the front wheel assembly, failed to prevent the leaning of the cart backwards over, and rolling it away on, its rear wheels.

None of these previously known devices totally disables the cart. If one wheel is locked, a person intent on removing the cart from the premises can exert enough force to overcome the friction of the locked wheel. None of the devices heretofore known can prevent all the wheels of the cart from being disabled. If two wheels are disabled, as is taught by the Herzog patent, the cart can still be maneuvered by tilting the cart so that it can still be rolled away.

OBJECTS OF THE INVENTION

Accordingly, it is a principal object of the present invention to provide for a shopping cart disabling assembly which will thwart the removal of the cart from the shopping market's premises by preventing the cart from being rolled away from the premises.

Another object of the present invention is to provide a pair of redundant wheels on the shopping cart that work, in conjunction with the disabling assembly when it is actuated, to limit the range of motion in a forward pushing direction to purely circular motion.

Another object is to provide a shopping cart disabling assembly which can conveniently and easily be reset by any employee of the shopping market.

Still another object is to provide a set of non-swiveling casters fixed to the front of the frame of the cart that, when the forward wheels of the cart are disabled and the cart collapses, support the weight of the cart when the non-swiveling casters engage the ground, and thus prevent the cart from being pushed forward, the non-swiveling casters being oriented parallel to one another and at an angle to the sides of the cart frame, thereby causing the cart to roll around in a circle.

Yet another object of the invention is to provide stop dogs affixed on rear casters which will prevent rotation of the rear casters and stop forward motion of the cart when the front of the cart is elevated off the ground in an attempt to defeat the front wheel disabling device of the invention.

Yet another object of the invention is to provide a collapsible front wheel assemby for a shopping cart in which disablement of the front wheel assembly is triggered by a radio frequency signal emitted from an underground cable.

Still another object is to provide as great a deterrent to a would be thief whose object it is to remove the shopping cart, so that the only way the thief could remove the cart from the parking lot would be to physically carry the cart away.

Still another object of the invention is to provide a front wheel assembly on a shopping cart that includes fixed-direction casters attached to the frame of the cart and swiveling casters attached to a collapsible suspension, wherein when the collapsible suspension becomes disabled and non-functional, the wheels of the fixed casters absorb the weight of the cart and redirect the momentum of the cart to purely circular motion.

These and other objectives are accomplished by the present invention which includes a first, collapsible, front suspension assembly for use with a shopping cart and a second, forward motion defeating, suspension assembly mounted to the cart forwardly of the collapsible front suspension assembly. The cart's collapsible front suspension assembly comprises (1) a support having two opposing sides with surfaces, (2) a sensor comprising means for transmitting an activation signal when a trigger signal (such as a magnetic, audio, rf, infrared or optical signal) is detected, (3) two release pins moveably mounted to the support, the release pins comprising an outer end being extendible beyond the side surfaces, respectively, (4) activation means for retracting the release pins upon receipt of the activation signal such that the release pins outer ends are not extending beyond the respective side surfaces, and (5) two linearly aligned hinge pins extending past the side surfaces, respectively.

The invention may further comprise a release pin movement assembly comprising a pivoting member rotatably mounted to the support; and rigid linking members extending from the pivoting member to an inner end of the release pins, respectively, the release pin movement assembly arranged such that the release pins are retracted and not extending beyond the side surfaces, respectively. The release pin movement assembly may further comprise holding means for locking the pivoting member in a first position such that the release pins extend beyond the side surfaces of the support; and the activation means may further comprise springs disposed about the release pins and between the linking member and the support sides such that the springs urge the release pins to retract, thereby resulting in the pivoting member rotating to a second position, and a trigger wire comprising a metal that contracts when heated through electrical resistance from a battery. In a preferred embodiment of the invention, the trigger wire is comprised of titanium nickel.

In an additional aspect of the invention, a shopping cart may be retrofitted with an anti-theft device in a process comprising the steps of removing a front wheel assembly from a U-shaped base frame having a front member and two side members extending from the front member and terminating in first and second back ends; and providing a front suspension system comprising a collapsible front suspension assembly comprising two opposing side surfaces of a support; sensor comprising means for transmitting a trigger signal when a magnetic field or audio frequency is detected; two release pins moveably mounted to the support, the release pins comprising an outer end being extendible beyond the side surfaces, respectively; activation means for retracting the release pins upon receipt of the trigger signal such that the release pin outer ends are not extending beyond the respective surfaces; two linearly aligned hinge pins extending past the side surfaces, respectively, two front wheels mounted to an underside of the support; and two casters supported on the cart frame forwardly of the support, the two casters being disposed parallel to one another and arranged at an acute angle to the longitudinal axis of the shopping cart base frame.

In another aspect of the invention, a process of preventing shopping cart theft comprising the steps of providing the shopping cart with a disabling device such as that described above, and generating a radio frequency along a perimeter of an area.

Further, objects and advantages are to provide a shopping cart that can be used easily and conveniently without damage to the shopping cart, or injury to a person using the cart, which is simple to use and inexpensive to manufacture, which can be supplied in great quantities, not require separate manufacturing facilities, which can be used repeatedly and is easy to maintain. Still further objects and advantages will become apparent from a consideration of the ensuing description and drawings.

DESCRIPTION OF THE PREFERRED EMBODIMENTS

Figure 1:
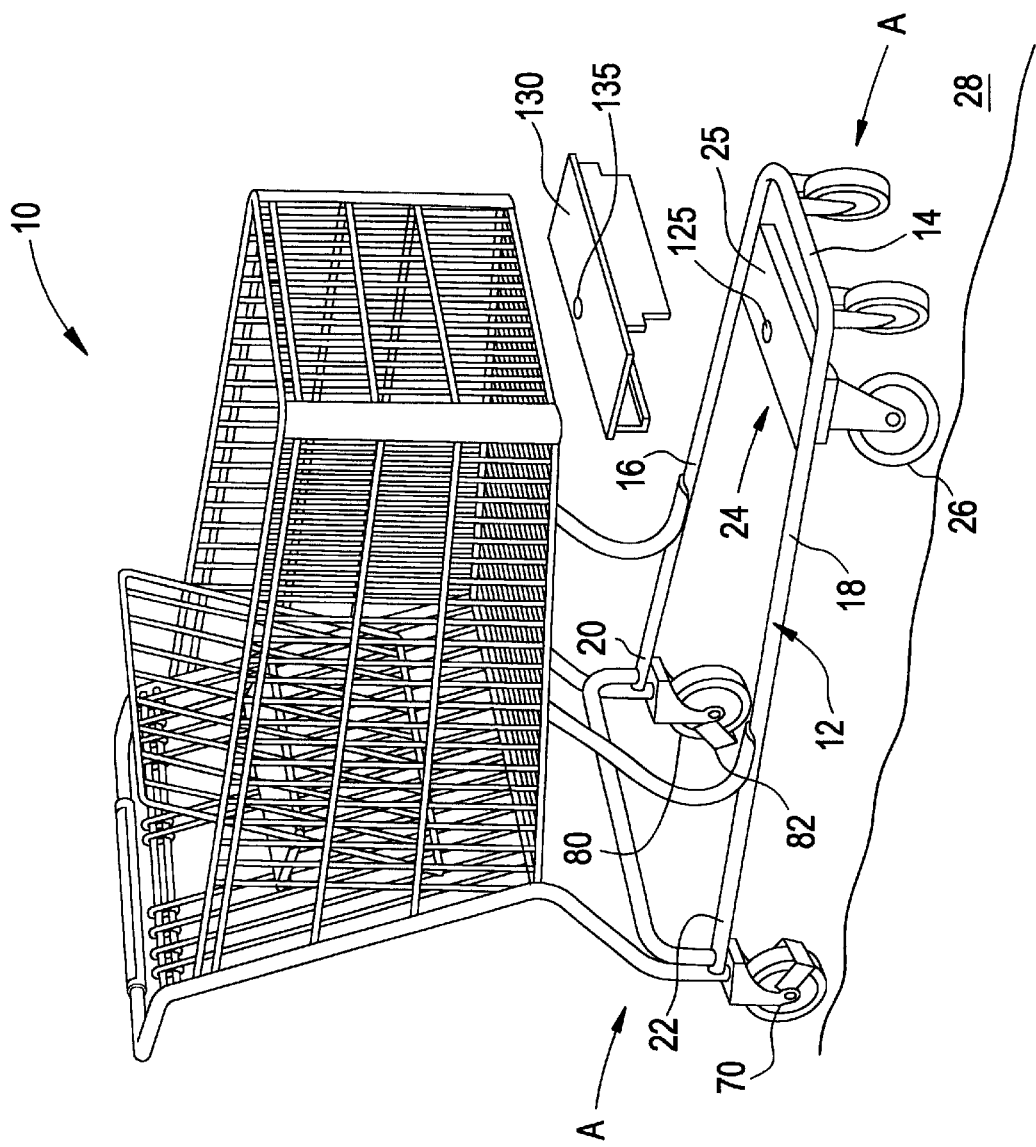
FIG. 1 shows an anti-theft shopping cart 10 according to the present invention in which the front wheel suspension asembly 24 of the cart is in a functional, operative, positions.

Referring now to the drawings in which like reference numerals refer to like elements throughout the figures, a shopping cart 10 according to the present invention has a U-shaped base frame 12 comprising a front member 14 and two side member 16 and 18 extending rearwardly therefrom. The side members 16 and 18 have back ends 20 and 22 respectively.

Figure 2:
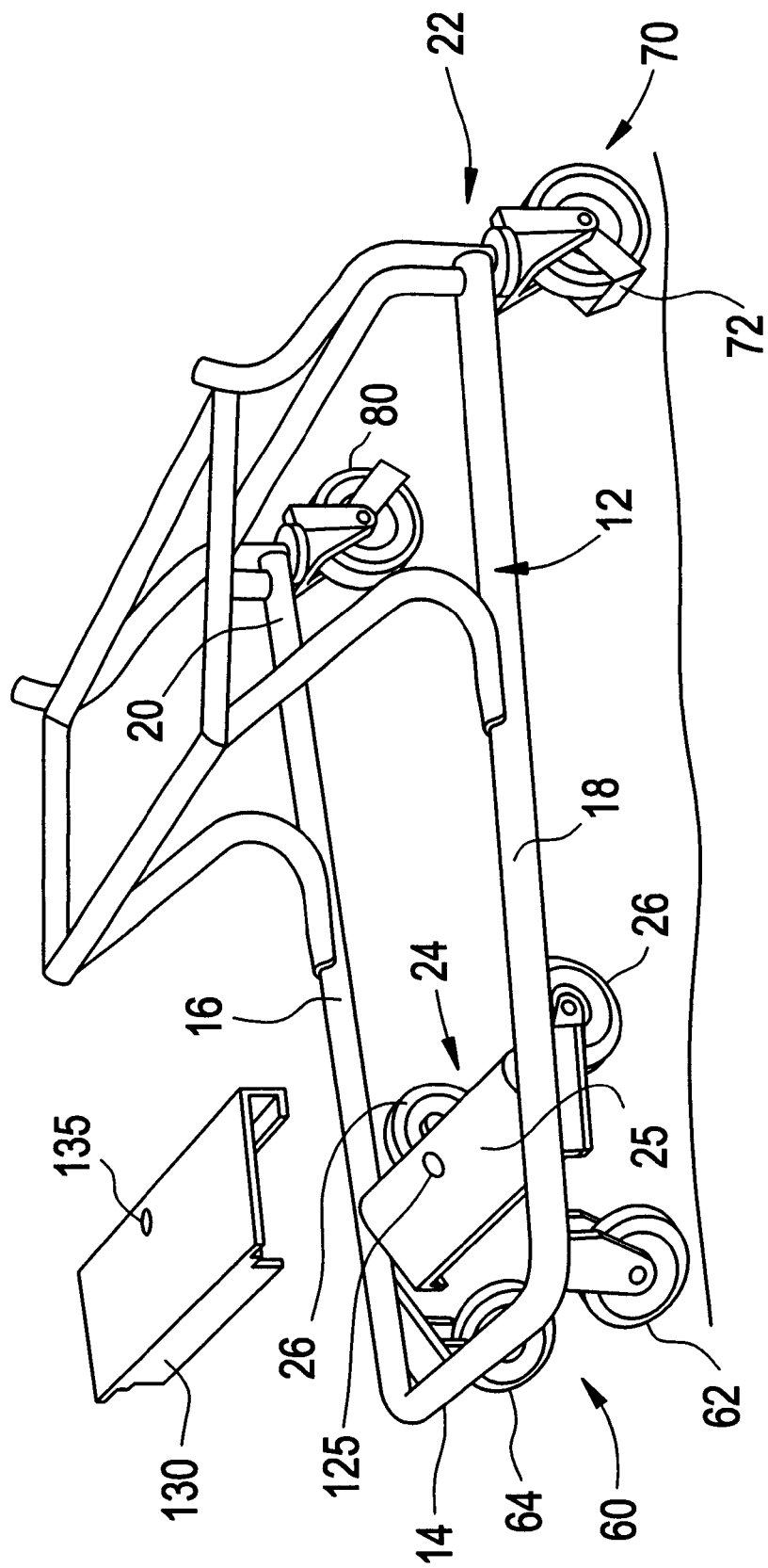
FIG. 2 shows the shopping cart base frame 12 (without the basket) with the front wheel suspension assembly 24 of the cart in a disabled, non-functional, "triggered" state and the fixed directional casters in an enabled, functional, state.
Figure 3:
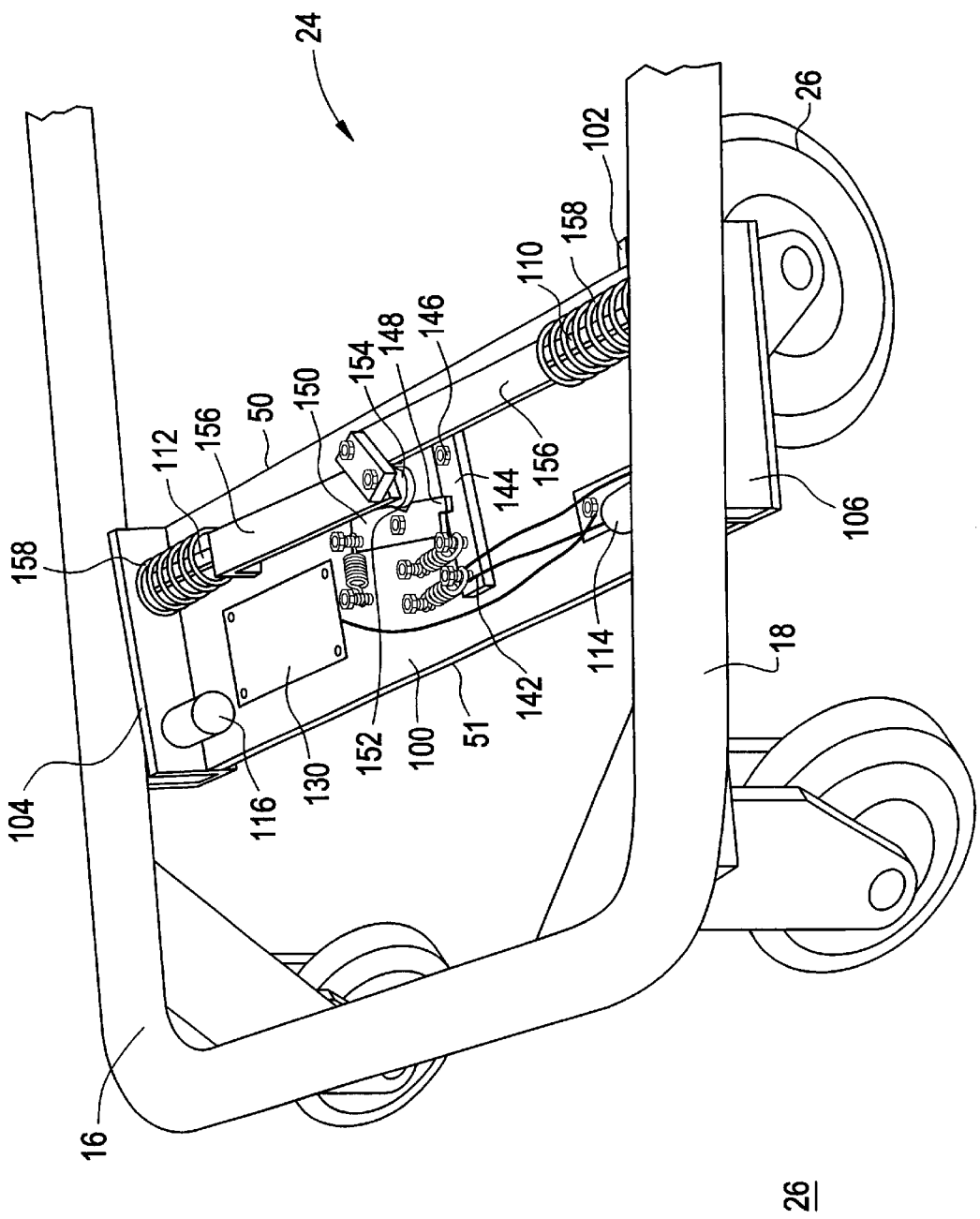
FIG. 3 shows details of the collapsible front suspension assembly 24 mounted to the base frame 12 of the shopping cart 10.

A collapsible front suspension assembly 24, shown in an untriggered, functional, state in FIG. 1 and a triggered, disabled, state in FIG. 2, extends between the two side members 16 and 18. The details of the suspension assembly 24 are shown in FIG. 3 and will be described below. The front wheels 26 of the cart are supported on the underside of the suspension assembly 24. A cover 25 sits atop the suspension assembly 24 and includes an opening 125 for external access to the "reset" component of the suspension assembly. A protective guard or shield 130 is mounted to the side members 16, 18 of the cart base frame to prevent undesired access to the suspension assembly 24. An opening 135 is provided in the shield 130 at a position corresponding to the opening 125 in the cover 25 (the purpose of this opening is to be described below).

Also supported by the side members 16 and 18 at a more forward position (see FIGS. 2 and 3 in particular) is a fixed direction caster assembly 60 comprising a pair of wheels 62, 64 that are arranged at an acute angle to the longitudinal axis A—A of the base frame 12 and respective support members 66, 68 that mount the casters to the base frame 12 of the shopping cart 10. Preferably, the support members 66, 68 are welded or bolted to the base frame of the cart such that they each are positioned adjacent the intersection of one side member and the front member 14 of the base frame. Preferably, the wheels 62, 64 are of the same or smaller diameter as the wheels of casters 26 attached to the suspension assembly 24, and are arranged parallel to one another and at an acute angle to the longitudinal axis A—A of the base frame.

Referring now to FIG. 3, the collapsible front suspension 24 is depicted in it's collapsed state, and includes a U-shaped tray-like support 100 having two opposing sides 102 and 104 with exterior side surfaces 106 (only one side surface is shown in FIG. 3). The front wheels 26 are preferably pivotably attached to the underside of the support 100.

The support 100 has two release pins 110 and 112 on opposing sides of the support 100 extending beyond the outer surfaces of the support 100 in the proximity of the rear end 50 of the support 100. The two release pins are movably mounted relative to the support 100 (described below in greater detail) such that the outer ends of the pins are extendable beyond the exterior side surfaces 106. This is to permit the outer ends of the pins to extend into holes formed in respective side members of the base frame 12 of the cart. The support 100 also has a pair of hinge pins 114, 116 extending along a front edge 51 of the support. Each hinge pin has an outer end extending beyond the exterior side surfaces 106 of the support 100. The pin outer ends are linearly aligned and engage in corresponding openings in respectively adjacent side members 16, 18 of the shopping cart base frame 12. Other embodiments of the invention may have a single hinge rod having opposing ends that perform a similar function as the two hinge pins. The support 100 can be secured directly to the U-shaped cart base frame 12 as for example by welding or bolts, or it can be secured to the cart frame using an intermediate member disposed between the outer surface of the support and inner surface of the side member, as was disclosed in applicants' prior co-pending patent application.

Figure 4:
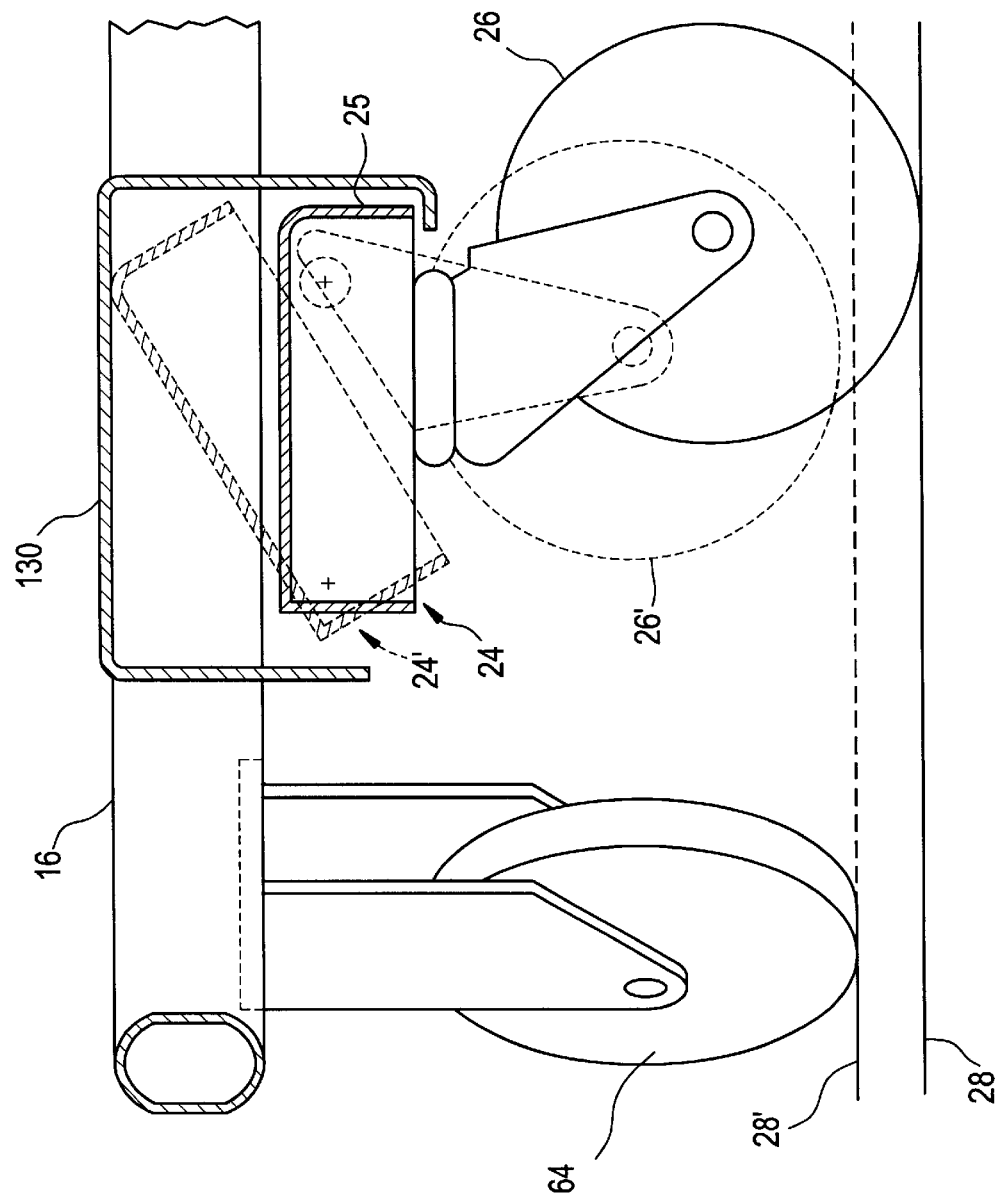
FIG. 4 shows the collapsible front suspension asembly 24 in operative and disabled states, and its functional relationship relative to the fixed directional casters.

Referring to FIG. 4, it can be seen that the non-collapsed, functional, suspension assembly is designated with the reference numeral 24, and the collapsed, non-functional, suspension assembly is designated with reference numeral 24' and is shown in phantom, dotted, lines. When the suspension assembly 24 becomes disabled and collapses, the fixed casters (only caster 64 is shown since FIG. 4 is a view of the forward region of one longitudinal half of the base frame) drop downwardly toward the surface 28, placing the wheels 62, 64 of the fixed directional caster assembly 60 in contact with the surface 28, and thereby inhibiting the shopping cart 10 from being pushed forward for any substantial distance. In fact, once the wheels 62, 64 make contact with the surface 28, motion of the shopping cart is constrained to circular motion only, in the direction in which the two wheels 62, 64 are directed, as long as the collapsible suspension assembly remains disabled or collapsed.

It is to be understood that when the collapsible suspension becomes disabled, the weight of the shopping cart is absorbed by the wheels 62, 64, and the momentum of the cart is redirected circular motion only. Furthermore, the combination of the collapsible suspension assembly with the fixed directional caster assembly prevents destruction of cart caster components when the collapsible suspension assembly becomes disabled, as is the case with various devices taught by the prior art, and also prevents injury to customers by absorbing the weight of the cart and smoothly redirecting motion instead of abruptly ceasing motion.

The suspension assembly of the cart is disabled by a triggering signal, such as an audio, magnetic or radio frequency signal, which is detected when the cart is pushed past a signal emitting member, such as an underground cable or a line-of-sight emitter. A sensor 130, mounted on the support 100, detects the triggering signal. The sensor transmits a disabling signal via a conduit 135 (eg, a wire) when a triggering signal is detected. Designs for sensors of the type needed to detect a triggering signal are well know in the art. Preferably, the sensor 130 and disabling signal produced thereby is powered by batteries carried by the suspension assembly.

The two release pins 110 and 112 in the suspension assembly 24 are moveably mounted to the support 100 such that outer ends of the pins are extendible beyond the exterior side surfaces 106. This permits the outer ends to extend into the holes formed in side members 16, 18. When a triggering signal is sensed, the sensor 130 transmits a disabling signal to activate the mechanism for retracing the pin ends. The disabling signal preferably is an electrical current from the batteries to a titanium nickel wire 142. This alloy has the property of contracting when heated. Thus, the current heats the wire and causes it to contract. The invention also contemplates the use of other resistive materials that contract upon heating. The contracting of the wire 142 moves a member 144 about a pivot point 146. As the member 144 pivots, a protrusion 148 on the member 144 disengages from a pivoting member 150. As a result, the member 150 pivots, thereby moving a notch 152 from engagement with the side of a second pivoting member 154, which, in turn, is rotatably mounted to the support 100.

The release pins 110 and 112 are connected to the pivoting member 154 via rigid linking members 156 such that when the pivoting member 154 pivots in one direction, the pins 110 and 112 are driven to extend beyond the exterior side surface 106, and when the pivoting member 154 pivots in an opposite direction, the pins 110 and 112 are retracted behind the surface 106. Springs 158 are disposed about the release pins 110 and 112 and between the respective linking member 156 and the support sides 104 such that the springs urge the release pins to retract. This arrangement permits the release pins to retract when the notch 152 is removed from the side of the second pivoting member 154.

To reset the release pins 110 and 112 into their extended position, the pivoting member 154 is rotated or pivoted such that the release pins extend beyond the exterior side surfaces 102, 106 and the notch 152 is reengaged with the side of the pivoting member 154. This is accomplished by engaging a tool with the tamper proof screw 160 and rotating the pivoting member.

The shopping cart 10 preferably also has theft-deterring wheels or casters at the rear end of the cart. These casters can be of two types—a pivotable caster 70 mounted for pivoting movement about its attachment to the base frame of the cart, or a fixed caster 80 fixedly mounted to, and at an attachment location on, the base frame of the cart (see FIGS. 1 and 2). Insofar as a pivotable caster typically can pivot freely about the attachment spindle with which it is attached to the base frame of the cart, preferably each caster 70 is provided with a forward facing stop dog that will face rearwardly when the cart is tilted backward onto its rear casters and the caster 70 pivots about it spindle 180°.

Preferably, each pivotable caster 70 (a cart may have two pivotable casters at the rear end) on the cart includes a U-shaped strap 72 which is positioned in a forward-facing manner, while each fixed caster 80 on the cart includes a U-shaped strap 82 facing rearwardly. The straps 72, 82 are provided as a means of preventing the cart from being moved in the direction in which the strap faces. Thus, the strap functions as a "stop dog" to further inhibit the shopping cart 10 from being pushed forwardly or rearwardly after the front suspension assembly has been disabled. Non-rotatable, fixed, wheels are prevented from rotating in a plane that is parallel to the surface 28.

If the front member of the cart is tilted upwardly to facilitate the wheeling away of the cart on its rear wheels, the stop dogs on the rear wheels will assist in preventing this by the engagement of the bottom edge 72, 82 of the stop dogs with the surface 28. As the bottom edge 38 is in contact with the surface 28, the wheel 34 is inhibited from rolling.

It is to be understood that the pivotable caster 70, as shown in FIGS. 1 and 2, is reversed, with the strap or stop dog facing forwardly. The purpose of this is to insure that motion of the cart would be thwarted if, when the front member 14 of the cart is tilted upwardly, a would-be thief instead tried to wheel the cart away in a direction. It is to be further understood that both rear casters on the cart 10 may be fixed casters or rotatable, and further that the rear casters may be one each of fixed and rotatable.

While the collapsible front suspension has been shown as collapsing toward the rear of the cart frame, another embodiment of the invention might also have the front suspension collapse toward the front of the cart frame 12.

To reset the release pins 110 and 112 from their retracted positions to their extended positions, a T-shaped tool such as the tool shown in Figure would be used to engage the internally threaded or recessed tamper-proof screw 160 in order to rotate the pivoting member 156 an amount sufficient to cause the release pins to extend beyond the exterior side surfaces 106 and the notch 52 to be reengaged with the side of the pivoting member 156.

Figure 5:
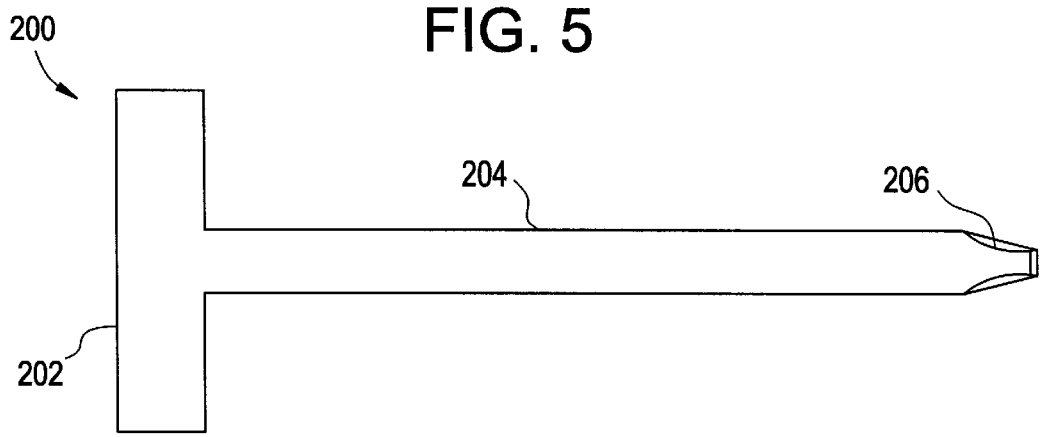
FIG. 5 shows a tool used to reset the disabled collapsible front suspension of the shopping cart 10.

The reset tool 200, shown in FIG. 5, is used to rotate the pivoting member 156, and comprises a handle 202, an elongated shank 204 disposed substantially normal to the handle, and a projecting end 206 that is provided with an end portion complimentarily configured to engage in the recess of the screw 155. For example, if the recess in the screw head is polygonal, the end 206 would bear an external polygonal configuration that complements that of the recess. The handle 202 facilitates turning of the tool 200 once it is engaged in the recess in the screw.

Figure 6:
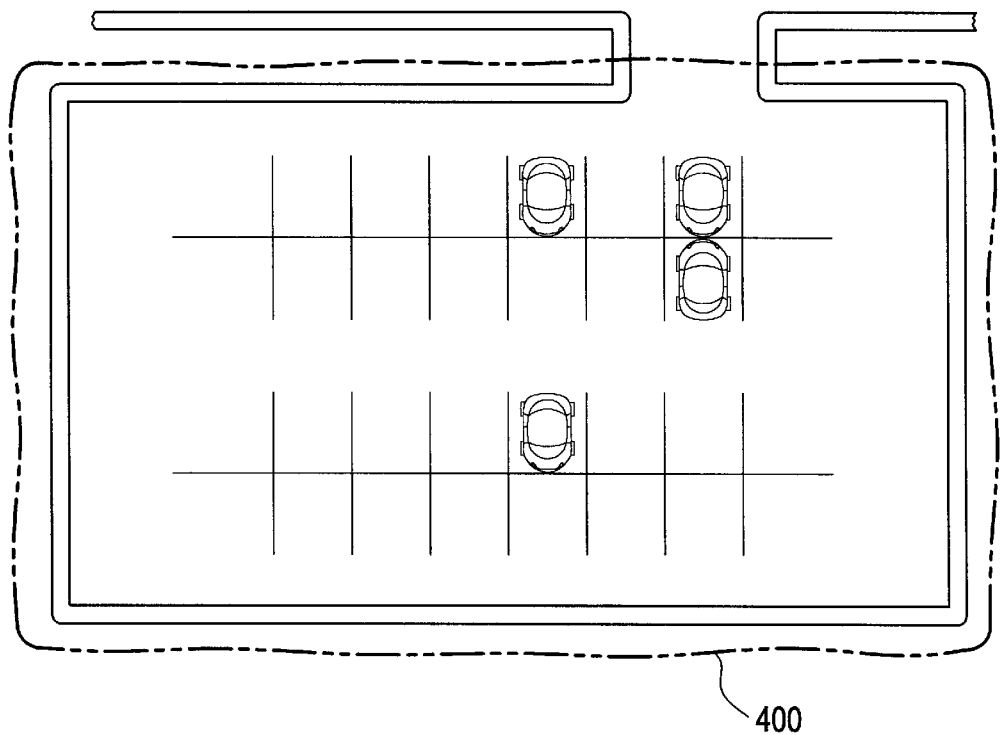
FIG. 6 is a plan view of a parking lot showing marking patterns that can be used to delineate boundaries past which the front suspension assemblies of the carts will be triggered, as well as buried conduits which are used to generate a triggering signal according to the invention.

Referring now to FIG. 6, the invention contemplates surrounding the perimeter of the area of protection (eg, a parking lot) with a cable or wire 400 that emits a "triggering" signal. Once the shopping cart 10 is pushed past the signal-emitting boundary, the front suspension 24 collapses, thereby disabling the shopping cart.

The present invention may be embodied in other specific forms without departing from the spirit or essential attributes. For example, the collapsible front suspension may be retrofitted onto existing shopping carts according to an embodiment of the invention. Moreover, the rear casters on the shopping carts can be interchanged so that the carts can have different types of rear casters or the same type of rear casters. Accordingly, reference should be made to the appended claims, rather than to the foregoing specification, as indicating the scope of the invention.

What is claimed is:

1. An anti-theft system for a shopping cart, comprising:
   (a) a collapsible front suspension mounted between the front side members of a base frame of the shopping cart, said front suspension including a support, a first set of casters mounted to said support, retractable pin means carried by said support and engagable with said side members of said base frame for maintaining said front suspension in an operative mode in which said first set of casters engage a supporting surface, a sensor for detecting a first external signal, means functionally coupled to the sensor for transmitting an activation signal to said retractable pin means to cause retraction of said pin means and render said front suspension inoperative, and
   (b) a second set of casters, fixed to said base frame, for preventing said cart from moving in a linear direction, when said front suspension is rendered inoperative.

2. The anti-theft system of claim 1, wherein said second set of casters are mounted on said shopping cart base frame forwardly of said first set of casters.

3. The anti-theft system of claim 2, wherein said second set of casters comprise wheels spaced apart and arranged parallel to one another.

4. The anti-theft system of claim 3, wherein said second set of casters are arranged at an angle to the longitudinal axis of said shopping cart.

5. The anti-theft system of claim 3, wherein said suspension assembly further comprises a reset fastener extending from a top surface of the pivoting member, the reset fastener having a portion engagable with a complementarily configured end of a reset tool.

6. The anti-theft system of claim 2 wherein:
   a. the release pin movement assembly further comprises means for holding the pivoting member in said first position; and
   b. the retracting means comprises a trigger wire comprising a metal that contracts when heated, the trigger wire being attached to the holding means such that contraction of the trigger wire results in the holding means releasing the pivoting member; and
   c. biasing means interposed between a support side and an adjacent linking member for urging the release pins into a retracted position.

7. The anti-theft system of claim 6, wherein the trigger wire is comprised of titanium nickel.

8. The anti-theft system of claim 1 wherein the suspension further comprises a pin movement assembly for moving said pin means from a first position in which the pins extend beyond side portions of said support and a second position in which the pins do not extend beyond the side portions.

9. The anti-theft system of claim 1, wherein said pin movement assembly comprises a pivoting member rotatably mounted to the support and a rigid linking member extending from the pivoting member to an inner end of each of the release pins, respectively, the release pin movement assembly being arranged such that rotation of the pivoting member in one direction effects movement of the release pins to said first position and rotation of the pivoting member in an opposite direction effects movement of the release pins to said second position.

10. The anti-theft system of claim 1, wherein said first set of casters are pivotably mounted to said support.

11. The anti-theft system of claim 1, wherein said shopping cart further includes a set of casters on the rear of said cart, at least one of said casters being rotatably mounted to the cart, and motion stopping means coupled to said at least one caster for locking said caster against rolling motion when said the front of said cart is tipped backward over said casters at the rear of the cart.

12. The shopping cart of claim 11, and further including sensor means carried by said collapsible front suspension assembly for detecting a collapsing signal, and trigger means for causing said front suspension assembly to collapse.

13. A shopping cart comprising:
a U-shaped base frame having a front member and two side members extending from the front member and terminating in first and second back ends, respectively,
a first set of casters for supporting the cart on a surface, said first set of casters being mounted on a collapsible front suspension assembly disposed between forward regions of said side members,
means for collapsing said front suspension assembly thereby rendering said first set of casters non-functional,
a second set of casters mounted to an underside of said side members, said second set of casters being disposed forwardly of said first set of casters and being rendered functional to support said cart for non-linear motion when said first set of casters becomes non-functional.

14. The shopping cart of claim 13, wherein said second set of casters are disposed parallel to one another and are arranged at an acute angle to said side members.

15. The shopping cart of claim 14, wherein said first set of casters are disposed closer to said surface than said second set of casters when said collapsible front suspension assembly is functional.

16. The shopping cart of claim 15, wherein a second wheel assembly is rotatably mounted to the second back end, said second wheel assembly comprising a second wheel mounted in a wheel holder and a rotation preventing member mounted to said wheel holder, said rotation preventing member being normally positioned in front of said wheel and preventing rolling motion of said second wheel whenever said shopping cart is tilted such that its front portion is lifted off the surface, whereby said wheel turns 180 degrees.

17. The shopping cart of claim 13, wherein a first back wheel assembly is non-rotatably mounted to the first back end of the cart and comprises a first back wheel mounted in a stop rolling dog, the first back wheel assembly being arranged such that the first back wheel is prevented from rolling when the first back wheel and a bottom edge of the stop dog contacts the surface.

18. A process of retrofitting a shopping cart with an anti-theft device comprising the steps of:
a. mounting a collapsible suspension assembly to a forward portion of the shopping cart, the collapsible suspension assembly carrying a first set of casters and means for triggering collapse of said suspension assembly,
b. mounting a second set of casters on the forward portion of said shopping cart, said second set of casters being located forwardly of said first set of casters.

19. A shopping cart having a base with forward and side members, comprising:
a collapsible front suspension assembly including sensor means for transmitting a trigger signal when a radio frequency signal is detected, and a first set of casters depending from said front suspension assembly, and
a second set of casters mounted to said shopping cart base forwardly of said first set of casters,
said second set of casters becoming operative to absorb the weight and momentum of said shopping cart when said first set of casters is rendered inoperative.

20. The shopping cart of claim 19, wherein said second set of casters comprises wheels mounted at an angle to the longitudinal axis of said shopping cart frame, and further becoming operative to redirect the momentum of said shopping cart to non-linear motion when said first set of casters becomes inoperative.

21. A process of preventing shopping cart theft comprising the steps of:
a. providing the shopping cart of claim 19, and
b. generating a radio frequency signal along a perimeter of an area.

22. A cart comprising a collapsible front wheel support including casters and a trigger means adapted to collapse the support upon receipt of a trigger signal, the trigger means comprising a contracting member that contracts upon heating, and additional casters attached to the cart forwardly of said front wheel support casters, whereby when said front wheel support collapses, said additional casters become operative to support said cart for non-linear motion.

23. The cart of claim 22, wherein the contracting member comprises a metal member that contracts upon heating through electrical resistance.

24. The cart of claim 23, wherein the metal member comprises titanium nickel.

* * * * *